United States Patent [19]

Warner et al.

[11] Patent Number: 4,505,631

[45] Date of Patent: Mar. 19, 1985

[54] METHOD AND APPARATUS FOR DUMPING CONTAINERS

[75] Inventors: Lee A. Warner, Raleigh, N.C.; Fred A. Fewin, Jr., Lubbock, Tex.

[73] Assignee: Cotton Incorporated, New York, N.Y.

[21] Appl. No.: 337,814

[22] Filed: Jan. 7, 1982

[51] Int. Cl.³ .............................................. B65G 67/46
[52] U.S. Cl. .................................... 414/359; 414/371; 414/419; 414/424; 414/576
[58] Field of Search ............... 414/364, 366, 346, 358, 414/359, 371, 385, 382, 384, 419, 420, 423, 576, 778, 786, 393, 421, 424; 105/261 R, 264, 273, 269; 298/18; 254/4 R, 47, 89 R; 212/189, 195, 198

[56] References Cited

U.S. PATENT DOCUMENTS

| | | | |
|---|---|---|---|
| 524,619 | 8/1894 | Sturm | 212/198 |
| 1,646,815 | 10/1927 | Glassen | 414/359 |
| 2,411,228 | 11/1946 | Paulsen | 414/366 X |
| 3,279,635 | 10/1966 | Avery et al. | 414/420 |
| 4,280,779 | 7/1981 | Warner et al. | 414/420 |

FOREIGN PATENT DOCUMENTS

| | | | |
|---|---|---|---|
| 551939 | 11/1956 | Italy | 414/371 |
| 1083794 | 9/1967 | United Kingdom | 212/189 |
| 163952 | 3/1963 | U.S.S.R. | 414/371 |

*Primary Examiner*—Robert J. Spar
*Assistant Examiner*—Janice Krizek
*Attorney, Agent, or Firm*—Burns, Doane, Swecker & Mathis

[57] ABSTRACT

The present invention relates to a method and apparatus for dumping the contents of a container. A container dumping apparatus according to the present invention includes a frame and a carrier positioned on the frame for movement relative to the frame. The carrier includes an arrangement for supporting the container to be dumped. An actuating device for moving the carrier between rest and final dumping positions includes a first tilting arrangement having a first portion and a second portion extensible/retractable relative to the first portion. At least one cable is anchored at an outer end to the carrier and at an inner end to the first portion of the first tilting arrangement. The extensible/retractable second portion of the first tilting arrangement is arranged to act upon the cable intermediate the anchored ends thereof to shorten the span of the cable extending between the carrier and the extensible/retractable second portion. The shortening of the span of the cable causes at least a portion of the carrier to raise and thereby tilt the container to an intermediate position between the rest and final dumping positions. A second tilting arrangement is connected to the first portion of the first tilting arrangement to displace the first portion for further tilting of the container to the final dumping position.

6 Claims, 12 Drawing Figures

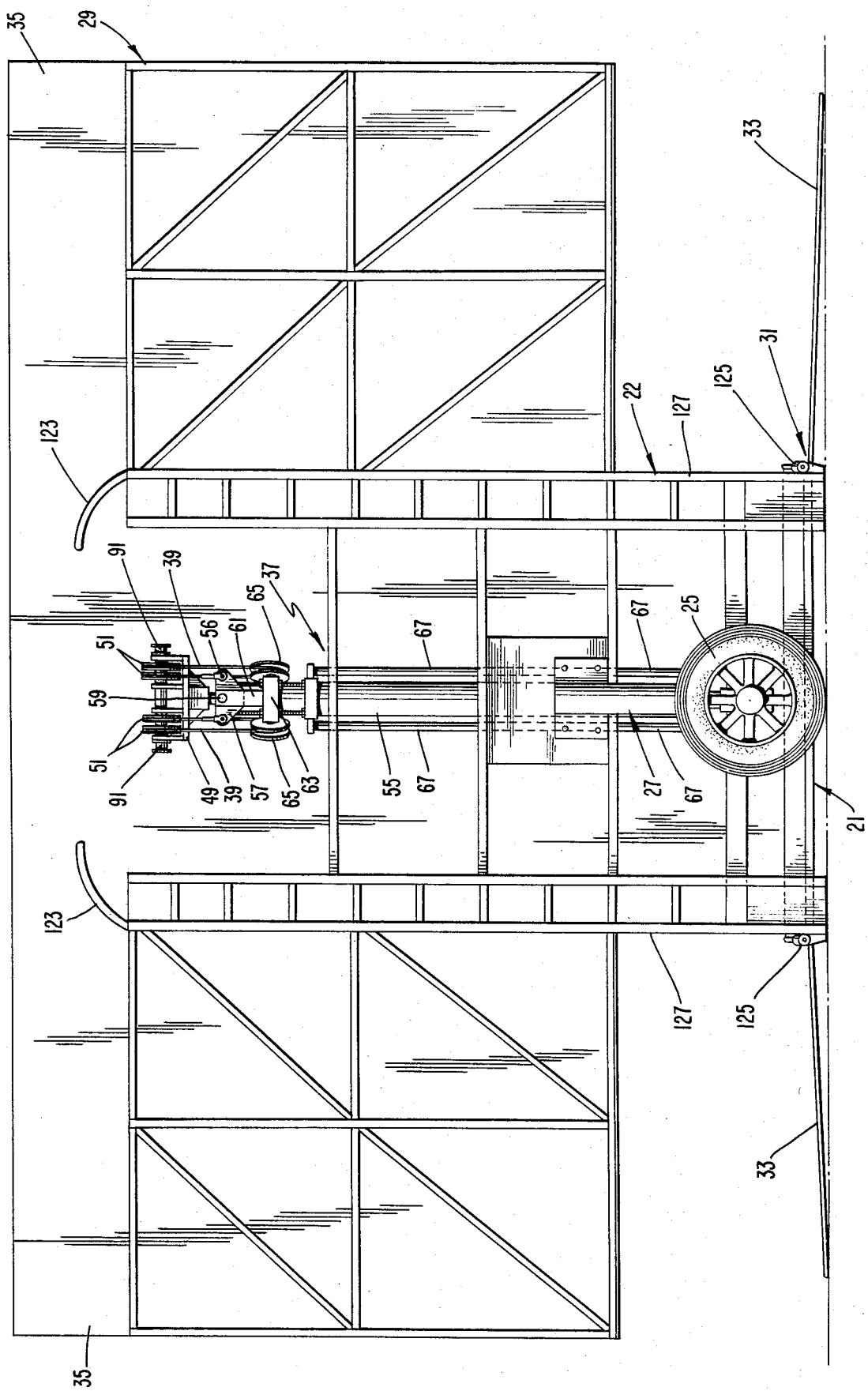

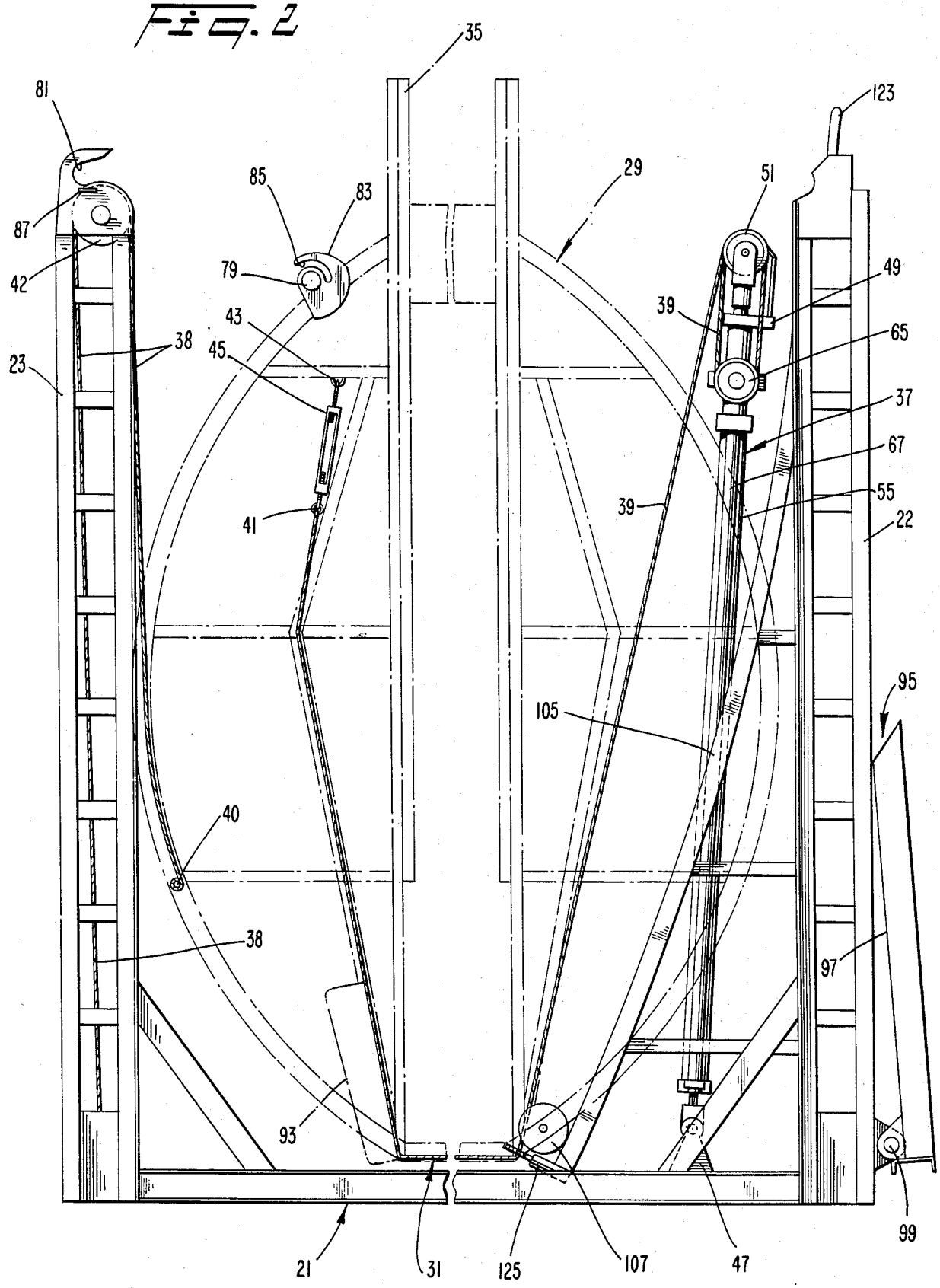

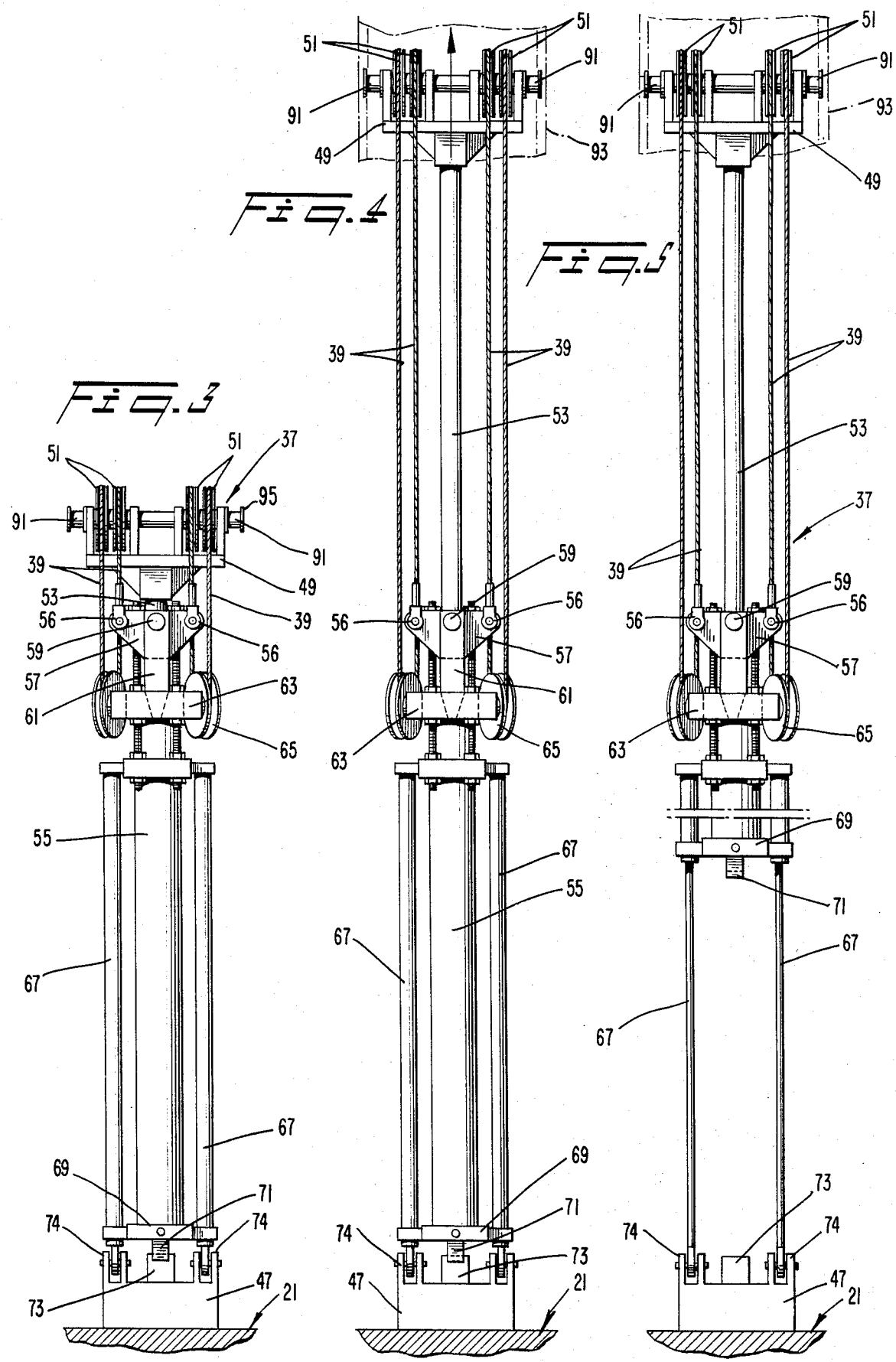

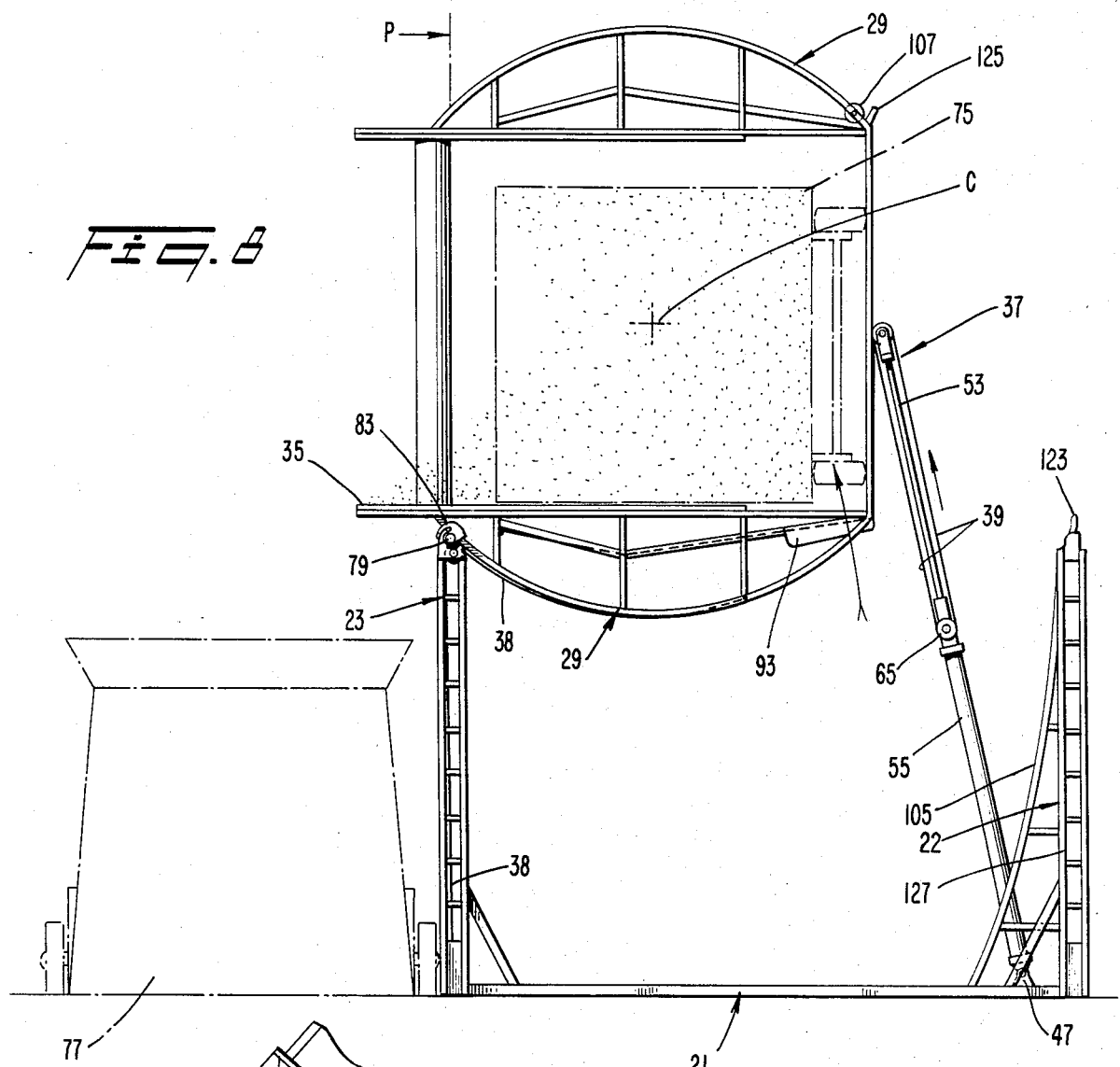
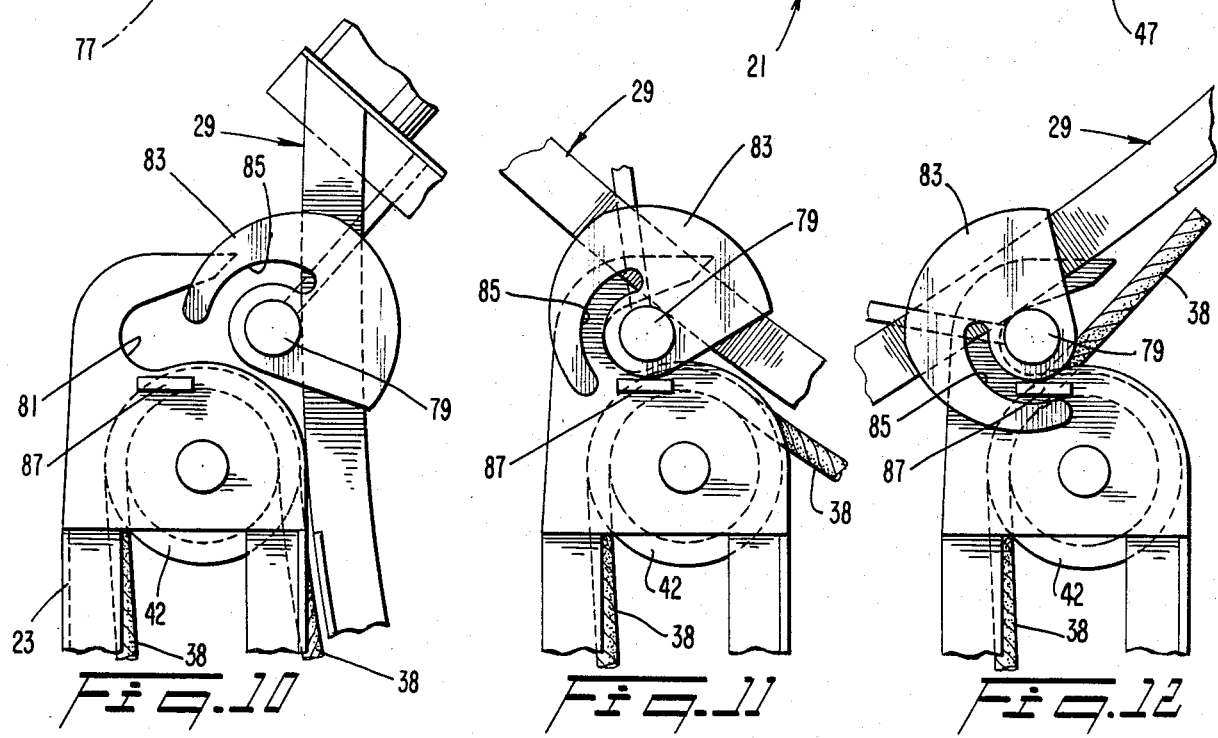

METHOD AND APPARATUS FOR DUMPING CONTAINERS

BACKGROUND AND OBJECTS OF THE PRESENT INVENTION

The present invention relates to a method and apparatus for dumping the contents of a container and, in particular, to the transfer of seed cotton from a mobile wagon to, for example, a cotton module-forming mechanism.

During a typical cotton harvest, not all of the cotton collected in mobile wagons is immediately transported to the ginning facility. Also, it is desirable to unload the mobile wagon promptly to permit the wagon to be returned to the field for refilling. Some cotton may be stored in the form of compacted stacks for later handling. In this fashion, the operating demands placed on the ginning facility can be distributed over a longer period of time to maximize efficiency.

The stacking of seed cotton for later use has heretofore been accomplished in some instances by a so-called cotton module builder, such as, for example, the type described in U.S. Pat. No. 3,749,003 issued to L. H. Wilkes et al on July 31, 1973, and assigned to the assignee of this invention. Such a module builder comprises a wheeled structure having two side walls, a front wall, and a back wall. The structure is open at the top to enable cotton to be dumped therein from a mobile transport wagon or harvester. A compacting mechanism is mounted on the structure and is operable to uniformly press the cotton into a tightly packed stack. Thereafter, the rear wall is raised and the module builder is advanced, leaving the stack behind in self-standing condition.

Various systems have been proposed for transferring cotton from a mobile transport wagon to the module builder. For example, one proposal involves the use of an air suction conveyor for lifting seed cotton from the wagon and conveying the cotton to a holding basket located above the module builder. When the basket becomes filled, it is dumped into the module builder.

Another proposal involves the use of a vehicle-mounted suction conveyor which withdraws cotton from the wagon and deposits the cotton directly into the module builder. Such a conveyor could be transported from site to site to service different module builders.

Yet another proposal involves the use of a mechanism for raising and tilting the transport wagon to dump seed cotton directly from the wagon into the module builder. Such a mechanism may include an L-shaped frame including a horizontal floor and an upright side. The side may be connected at its upper end to a stationary base by a horizontal pivot to enable the L-shaped frame to be swung upwardly and downwardly. In practice, a transport wagon is driven onto the floor of the L-shaped frame and anchored thereto. Thereafter, a crane hoists the L-shaped frame about its pivot connection to raise and to tilt the wagon over the module builder such that the cotton gravitates from the wagon.

A system has also been proposed in which the transport wagon would be driven onto a carrier and anchored thereto. The carrier would then be rotated on rollers about a longitudinal horizontal axis to dump the cotton into a pit located beneath the carrier.

Additional proposals are described in U.S. Pat. Nos. 527,117 issued to Long on Oct. 9, 1884; 1,579,927 issued to Griess on Apr. 6, 1926; 1,768,847 issued to Kidder on July 1, 1930; 2,179,100 issued to Ramsay on Nov. 7, 1939; and 2,374,009 issued to Grossmith et al on Apr. 17, 1945, as well as in British Pat. Nos. 240,600 and 292,302 issued to General Electric Company Limited on Oct. 8, 1925 and June 21, 1928, respectively. In each of these patents a carrier is mounted on a framework for rolling movement along a surface of the frame. Generally, such surfaces are either horizontal or slightly inclined (see U.S. Pat. No. 2,374,009). A cable mechanism is provided for rolling the carrier along the surface so that a container mounted on the carrier can be inverted over a receiver container.

In general, such systems relate to dumping mechanisms which constitute permanent installations and thus are not adapted to be easily transported within a field such as would be desirable for agricultural purposes. Moreover, mechanisms which "roll" the product-carrying wagon in a horizontal direction occupy considerable space and must be located on ground which is elevated relative to the product-receiving zone or container.

In commonly assigned U.S. Pat. No. 4,280,779 issued July 28, 1981 to Warner et al, a dumping mechanism is disclosed wherein a mobile frame is provided having first and second vertical sides. A drum-like carrier is positioned on the frame and is adapted to receive and support a container (trailer) to be dumped. A dumping assembly is operably connected to the carrier and includes an actuating mechanism which is selectively actuable to roll the carrier upwardly along either side of the frame to invert the carrier and dump the contents of the container. The actuating mechanism comprises an extensible/collapsible boom including telescopic inner and outer portions. A cable extends around the boom and is connected at one end to the carrier. The other end of the cable is mounted on a cable take-up winch which is actuable to shorten the effective cable length to extend the outer boom portion and cause the carrier to roll upwardly along the side of the frame. Upwardly rolling movement of the carrier continues until a pin on the carrier engages a slot in the side of the frame. Thereafter, continued extension of the boom causes the carrier to rotate about the pin-slot connection to invert the container and dump the contents.

Such a dumping mechanism has been successfully tested for dumping the contents of cotton trailers. It would be desirable, however, to enable the tilt angle or dumping inclination of the carrier to be further increased to ensure prompt and complete discharge of the entire contents of the trailer. To position the trailer or container to achieve a sharp dumping inclination, the center of gravity of the carrier/container assembly must pass across the rotary axis of the carrier. Accordingly, a positive control must be exerted over the carrier sufficient to pull the carrier backwardly into the frame after dumping has been completed. A mechanism of the type described in the Warner et al patent, wherein the cable is taken-in to extend a boom, relies upon gravity to return the carrier to the lowered rest position. It is thus necessary to terminate rotational movement of the carrier in the dumping direction before the center of gravity passes across the axis of rotation.

It will also be appreciated that a mechanism which pivots a heavy drum toward one side of a frame may tend to be unstable. Such instability can be more easily dealt with in permanent installations than in portable units where it is essential that the unit be deployed and set up in a relatively short period of time.

Accordingly, it is an object of the present invention to minimize or obviate the problems of the type discussed above.

It is another object of the present invention to provide a novel method and apparatus for dumping the contents of containers.

It is a further object of the present invention to enable a container to be dumped by a mechanism which is mobile and of relatively short height and narrow width.

It is still a further object of the present invention to provide a mechanism for dumping a cotton wagon, which mechanism is portable in the gin yard.

It is yet another object of the invention to enable a container to be tilted to a sharp angle of inclination to ensure the complete discharge of all of the contents to be dumped.

It is still another object of the invention to provide a novel container dumping method and apparatus whereby a portable dumping mechanism can be rendered stable for dumping in a relatively rapid manner.

BRIEF SUMMARY OF THE PRESENT INVENTION

These and other objects are achieved by a novel container dumping apparatus and method according to the present invention. The apparatus includes a frame and a carrier positioned on the frame for movement relative thereto. The carrier includes an arrangement for securely supporting the container to be dumped. An actuating device for moving the carrier between rest and final dumping positions includes a first tilting arrangement having a first portion and a second portion which is extensible/retractable relative to the first portion. At least one cable is anchored at an outer end to the carrier and at an inner end to the first portion. The extensible/retractable second portion of the first tilting arrangement is arranged to act upon the cable intermediate the anchored ends of the cable to shorten the span of the cable extending between the carrier and the extensible/retractable second portion. In this way, at least a portion of the carrier is raised to tilt the carrier to an intermediate position between the rest and final dumping positions. A second tilting arrangement connected to the first portion of the first tilting arrangement displaces the first portion to further tilt the carrier to the final dumping position.

In a preferred embodiment of the present invention, the frame includes a substantially vertical wall which is engaged by the carrier at the intermediate tilted position to define a substantially horizontal pivot axis about which the carrier rotates from the intermediate tilted position to the final dumping position. Still further in a preferred embodiment, the carrier and the extensible/retractable second portion are interengaged when the carrier reaches the intermediate tilted position to interconnect the carrier and the extensible/retractable second portion during travel of the carrier between the intermediate tilted position and the final dumping position. In this way, return of the carrier to the rest position is facilitated.

Still further according to the preferred embodiment, the pivot axis is contained within an imaginary vertical plane with a center of gravity defined by the combined container and carrier lying on a side of the imaginary plane oriented toward the rest position. The center of gravity passes across the imaginary plane during movement of the container and carrier to the final dumping position.

In a further aspect according to the present invention, a method and apparatus is provided for counter-balancing the container and carrier when the container and carrier are in the final dumping position. In a preferred embodiment, the counterbalancing arrangement includes a structure mounted on the frame for movement between a stowed position and an accessible position. The structure is located on a side of the frame which is opposite a side on which the dumping takes place. The structure is adapted in the accessible position to be driven upon by a vehicle to counterbalance the forces exerted on the frame during dumping.

A method according to the present invention for dumping the contents of a container includes the steps of supporting a container on a carrier mounted on a frame for movement relative thereto. A first power driven tilting arrangement is operated such that an extensible/retractable portion thereof is extended and acts upon a cable whose ends are anchored to the carrier and a first portion of the first tilting arrangement. In this way, a span of the cable extending between the extensible/retractable portion and the carrier is shortened to thereby raise at least a portion of the carrier to tilt the carrier to an intermediate tilted position. A second tilting arrangement is subsequently operated which tilting arrangement is connected to the first portion to displace the first portion and further tilt the carrier to a final dumping position.

BRIEF DESCRIPTION OF THE DRAWINGS

Preferred embodiments of the present invention will be described in greater detail with reference to the accompanying drawings, wherein like members bear like reference numerals and wherein:

FIG. 1 is a side elevational view of a dumping apparatus according to the present invention;

FIG. 2 is a schematic front view of the dumping apparatus according to the present invention;

FIGS. 3–5 are sequential views of an actuating arrangement for dumping a container according to the present invention;

FIGS. 6–9 are sequential views of a dumping of a container according to the present invention; and FIGS. 10–12 are sequential detail views of an engagement of the carrier and a frame during final dumping movement according to the present invention.

DETAILED DESCRIPTION OF THE PREFERRED EMBODIMENTS

Figure 6:
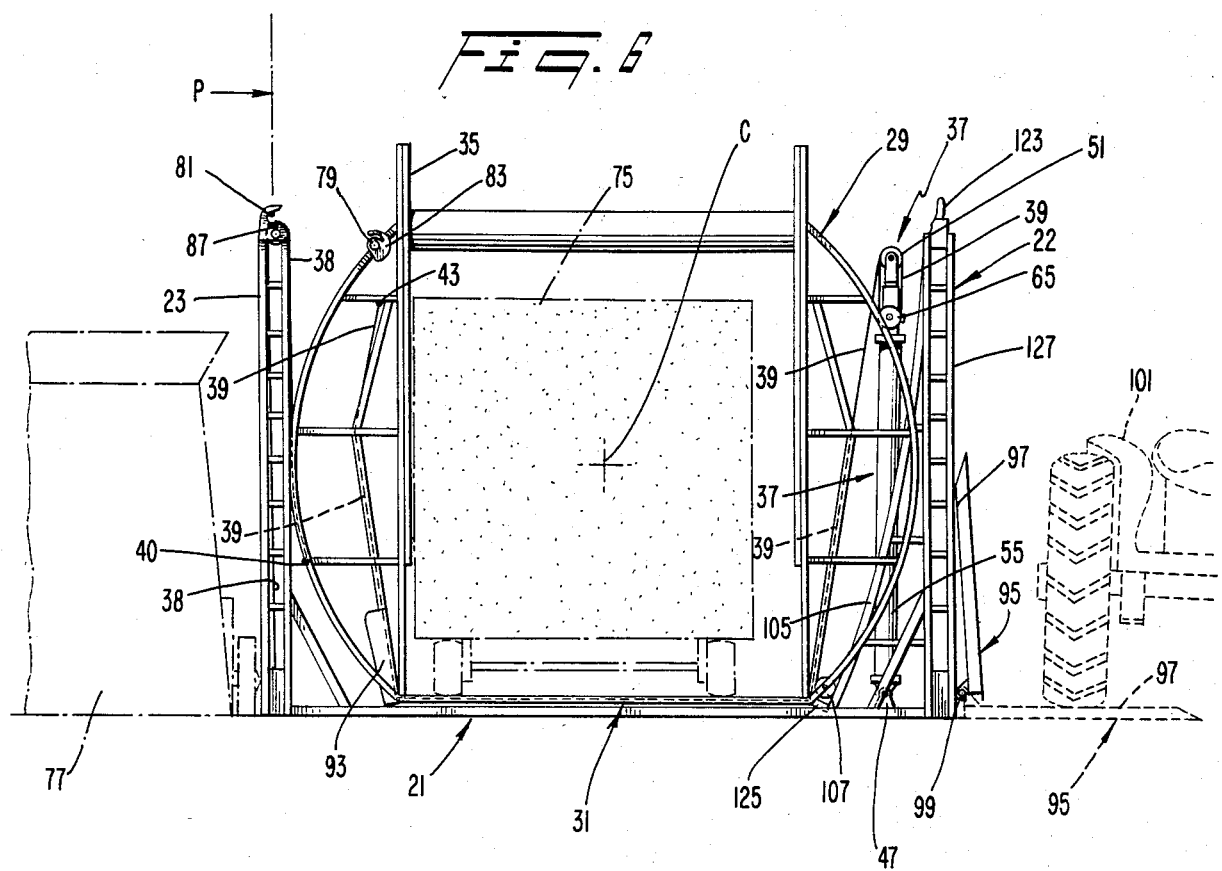

With reference to FIG. 1, a dumping apparatus according to the present invention includes a frame 21 having a substantially vertical support wall 22. Also arranged on the frame 21 are a plurality of wheels 25 (only one of which is shown) which are provided to facilitate transport of the dumping apparatus. As shown in FIG. 1, the wheel 25 is in an inoperative position with the frame 21 resting on the ground surface. However, if it is desired to move the dumping apparatus according to the present invention, the wheel 25 may be extended to lift the frame 21 off of the ground surface, for example, by actuation of an hydraulic piston-cylinder arrangement 27.

Also arranged on the frame 21 is a carrier 29 including a floor 31 adapted to receive a container, e.g., a wagon, which is to be dumped. The floor 31 preferably includes ramps 33 arranged at either end thereof to facilitate entry and exit of a wheeled container within the carrier 29. The carrier 29 further includes at least one substantially vertical wall 35 for supporting a container during dumping. Also arranged on the frame is an actuating arrangement 37 which is adapted to raise and to tilt the carrier 29 and a container arranged therein from a rest position to a final dumping position.

With reference to FIG. 2, the carrier 29 is provided with a somewhat cylindrical shape with the actuating arrangement 37 arranged toward one side of the frame 21. The actuating arrangement 37 further includes at least one cable 39, preferably two cables, with each cable extending from the actuating arrangement 37 around a lower portion of the carrier 29 to an outer end 41 which is securely anchored to an upper portion 43 of the carrier 29 opposite the side on which the actuating arrangement 37 is located. Metal guides (not illustrated) may be provided on the carrier 29 to facilitate a sliding of the cable 39. Such metal guides may extend upwardly above the carrier and include an arrangement for holding the upper end of the actuating arrangement 37 when in the fully retracted position to facilitate transportation of the dumping apparatus. In the illustrated embodiment, the cable end 41 is anchored to the upper portion 43 through an arrangement 45 which permits tightening and/or loosening of the cable 39.

A further cable 38 is secured to the carrier 29 at a location 40 generally opposite the actuating arrangement 37. The cable 38 passes upwardly to an upper end of a substantially vertical wall 23 over which dumping is to occur and around a pulley 42. The cable 38 passes downwardly along the vertical wall 23 to a suitable take-up arrangement (not shown). The take-up arrangement serves to maintain tension in the cable 38. The cable 38 acts as a guide and a support for the carrier 29 during upward rolling movement of the carrier 29 which movement will be described in detail later. In the preferred embodiment, two cables 38 are provided, one along each end of the vertical wall 23.

With further reference to FIG. 2, a curved guide track 105 is secured to the frame 21 along the vertical wall 22. A guide or training wheel 107 is rotatably secured to a lower portion of the carrier 29 and is adapted to engage the guide track 105. The curve of the guide track 105 is selected such that upon initial upward lifting and tilting of the carrier 29 by operation of the actuating arrangement 37 the training wheel 107 remains in engagement with the guide track 105. The guide track 105 and guide wheel 107 cooperate together to substantially prevent displacements of the carrier 29 laterally and along its longitudinal axis during movement of the carrier 29 toward a final dumping position. Such a guiding arrangement is particularly significant when the dumping apparatus is located on a ground surface which is not substantially level.

In the preferred embodiment, two guide tracks 105 and guide wheels 107 are provided on opposite sides of the actuating arrangement 37. Also in the preferred embodiment, the guide tracks 105 each comprise an angle iron which engages with a corresponding V-shaped groove in the guide wheels 107.

With reference to FIGS. 3-5, the actuating arrangement 37 is pivotably arranged on a base 47 secured to the frame 21. At an upper end of the actuating arrangement 37 is a support 49 for a plurality of pulleys 51 for guiding the cables 39. In the illustrated embodiment, two pulleys 51 are arranged on either side of the support 49. The support 49 is attached to an upper end of an extensible/retractable hydraulic piston 53 which is arranged within a cylinder 55. In other words, upon extension of the piston 53, the support 49 and the pulleys 51 thereon move upwardly (FIG. 4).

Inner ends 56 of the cables 39 are securely anchored to opposite sides of a tension equalizer plate 57. The equalizer plate 57 is pivotably attached about a center point 59 of the plate to the cylinder 55 or a portion fixed relative to the cylinder 55 by any suitable securing device. The inner ends 56 of the cables 39 are preferably secured parallel to one another at locations opposite and substantially equidistantly spaced from the center point 59. A tongue 61 extends from the equalizer plate 57 into a guide 63 which is adapted to limit the pivotal movement of the equalizer plate 57.

The equalizer plate 57 serves to compensate for any slight variations in the tension upon either of the cables 39 and also provides an arrangement which permits the dumping apparatus according to the present invention to operate in the event of a breakage or failure of one of the cables 39. Each of the cables 39 extends from the equalizer plate 57 around one of the upper pulleys 51 back toward a lower end of the actuating arrangement 37. Each cable 39 then passes around an angled pulley 65 secured to the guide 63 or another portion fixed to the cylinder 55. After passing around the angled pulley 65, the cable 39 extends upwardly around a respective second one of the pulleys 51 and subsequently around the carrier 29 to be secured thereto (FIG. 2).

The arrangement of pulleys is provided in order to increase the mechanical advantage of the extensible piston 53. The angle of the angled pulleys 65 is arranged such that the cable passes around each of the upper pulleys 51 parallel with the respective one of the pulleys 51. In other words, binding of the cable is substantially eliminated due to the angled orientation of the pulleys 65. Accordingly, by the angular arrangement of the pulleys 65, the operation of the device according to the present invention is smoother than that which would be obtained if the pulleys 65 were arranged parallel to the pulleys 51.

The extensible/retractable piston 53 and the cylinder 55 together serve as a first tilting arrangement for the carrier 29 as will be described in greater detail subsequently. The actuating arrangement 37 further includes a pair of relatively smaller hydraulic piston-cylinder arrangements 67 arranged parallel to and on either side of the main hydraulic cylinder 55. The piston-cylinder arrangements 67 define a second tilting arrangement for the carrier 29. After full extension of the piston 53, the piston-cylinder arrangements 67 are actuated simultaneously by a separate power control to displace, i.e., elevate, a lower end 69 of the main hydraulic cylinder 55. By providing two separate tilting arrangements operated by separate fluid systems, control of the tilting of the carrier 29 is more stable and greatly facilitated.

Elevation of the cylinder 55 is permitted since the cylinder 55 is arranged with a half-rod or half-clevis eye 71 which is supported on a rounded pedestal 73 arranged upon the base 47 of the actuating arrangement 37. In other words, upon extension of the hydraulic piston-cylinder arrangements 67 (FIG. 5) the lower end 69 of the cylinder 55 lifts from the pedestal 73 and hence the upper end, i.e., the support 49 and the pulleys 51, of the first tilting arrangement extends further upwardly to thereby further tilt the carrier 29 due to the connection of the cables 39 between the carrier 29 and the extensible/retractable portion of the first tilting arrangement.

The half-rod 71 and the pedestal 73 arrangement permit pivotal movement of the first tilting arrangement during extension. It should also be noted that the pistons of the piston-cylinder arrangements 67 are pivotably attached to the base 47 of the actuating arrangement 37 by a suitable pivotable connection 74.

With reference to FIGS. 6–9, a container 75 in the form of a trailer (shown in phantom lines) is arranged within the carrier 29. The container 75 is securely anchored to the carrier 29 by any suitable apparatus (not shown), preferably against the vertical wall 35. Arranged on a side of the vertical wall 23 of the frame 21 opposite the carrier 29 is a receptacle 77 (shown in phantom lines) which is arranged to receive the contents of the container 75 upon dumping of the container by the dumping apparatus according to the present invention. The receptacle may, for example, be a cotton module builder described previously. The vertical wall 23 is arranged along a substantially vertical imaginary plane P. The carrier 29 and the container 75 together have a combined center of gravity generally indicated by C. As seen in FIG. 6, the carrier 29 and therefore the container 75 are in a rest position.

Figure 7:
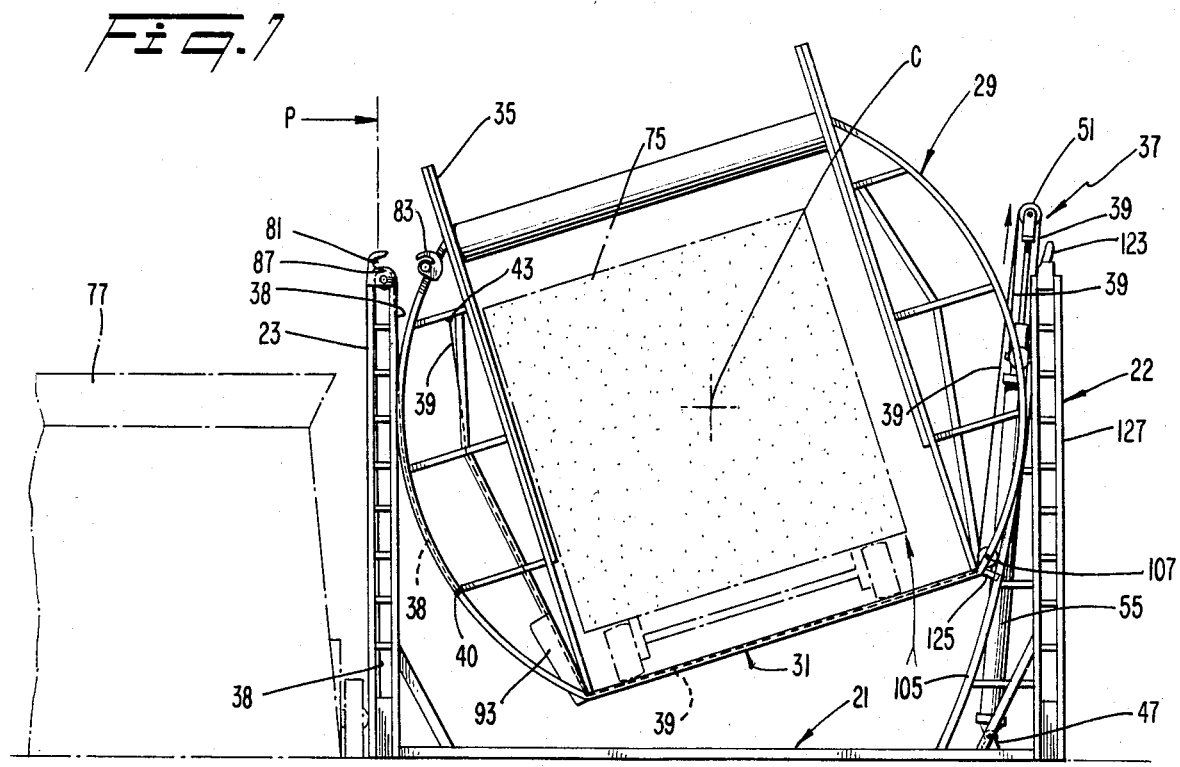

The operation of the dumping method and apparatus according to the present invention will be described with further reference to the sequence illustrated in FIGS. 6–9. As seen in FIG. 7, the first tilting arrangement, i.e., the extensible/retractable piston 53 and the associated cylinder 55 is operated to extend the upper end of the piston 53. Since the outer ends 41 of the cables 39 are fixed to the carrier 29 (FIG. 2) and the inner ends 56 of the cables 39 are fixed to the equalizer plate 57 (FIGS. 3–5), the extension of the piston 53 causes the span of the cables 39 between the carrier 29 and the extensible/retractable piston 53 (i.e., the pulleys 51) to be shortened since a larger portion of the cables 39 must extend between the pulleys 51 and the equalizer plate 57. The shortening of the cables 39 causes at least a portion of the carrier 29 with the container 75 arranged therein to begin to be lifted. This lifting thereby causes the carrier 29 to "roll" upwardly along the cable 38 and the vertical wall 23 of the frame 21. Simultaneously therewith, the guide wheels 107 move upwardly along the guide tracks 105.

Figure 9:
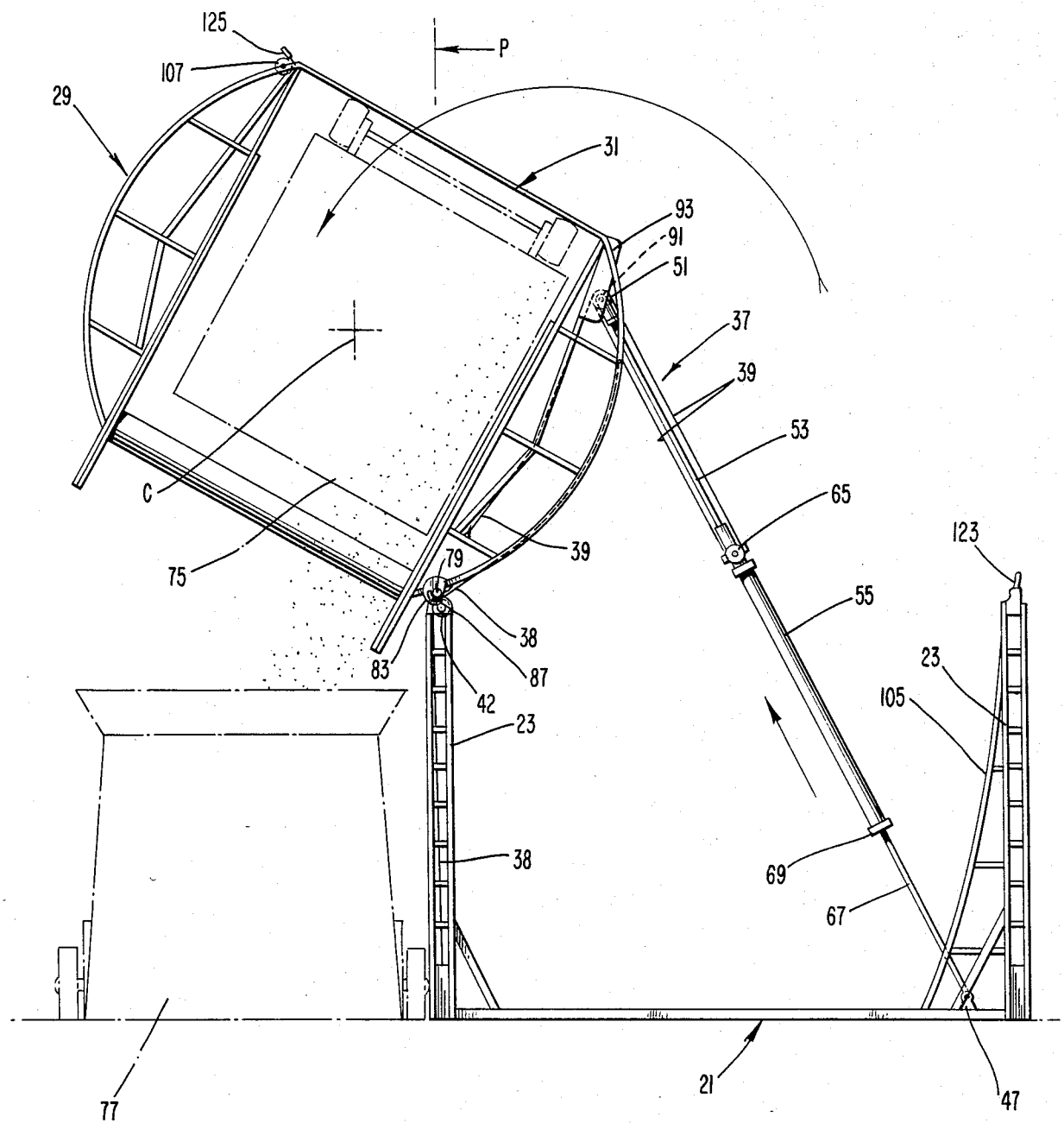

Upon further extension of the piston 53, the carrier 29 is tilted to an intermediate position between the rest position (FIG. 6) and the final dumping position (FIG. 9). In this position, the center of gravity C of the combined container 75 and carrier 29 is still arranged to a side of the plane P which side is oriented toward the rest position or opposite the side on which dumping is to occur. It should be noted that the entire actuating arrangement 37 pivots on the base 47 during the tilting operation.

Before reaching the intermediate tilted position shown in FIG. 8, a pin 79 on the carrier 29 engages within a hook-shaped slot 81 provided at an upper end of the vertical wall 23 of the frame 21. The engagement of the pin 79 in the slot 81, as best seen in FIGS. 10–12, establishes a substantially horizontal pivot axis defined by the pin 79 about which the carrier 29 may be further rotated or tilted. In a preferred embodiment, the pin 79 engages the slot 81 after approximately 30°–40° of carrier rotation. In other words, the pin 79 is engaged in the slot at a position intermediate the positions shown in FIGS. 7 and 8 when the guide wheels 107 are still engaged with the guide tracks 105. In this way, the guide wheels and tracks not only prevent longitudinal displacements of the carrier, but also ensure engagement of the pin 79 with the slot 81.

Upon reaching the intermediate position, the second tilting arrangement, i.e., the piston cylinder-arrangements 67, are operated (FIG. 9). Extension of the piston-cylinder arrangements 67 causes further upward displacement of the cylinder 55 of the first tilting arrangement. This further displacement causes pivotal movement of the carrier 29 about the horizontal axis defined by the pin 79. It should be noted that the piston-cylinder arrangements 67 forming the second tilting arrangement according to the present invention are considerably smaller than the piston 53 and cylinder 55 forming the first tilting arrangement according to the present invention. The smaller size cylinders are sufficient to further pivot or tilt the carrier 29 since a portion of the load of the container-carrier is borne by the vertical wall 23 of the frame 21 due to the engagement of the pin 79 within the slot 81.

As the piston-cylinder arrangements 67 are further extended, the contents of the container 75 begin to dump from the container into the receptacle 77. Upon full extension of the piston-cylinder arrangements 67, the carrier 29 has traversed through an angle of 170° to 175°. In other words, the carrier 29 has almost substantially inverted. This substantial inversion of the carrier 29 and the container 75 arranged therein ensures that the contents of the container 75 will be rapidly and fully dumped into the receptacle 77. It should also be noted that the center of gravity C has passed through the plane P of the vertical wall 23 of the frame 21 and the horizontal pivot axis defined by the engagement of the pin 79 in the slot 81.

In order to ensure that the pin 79 on the carrier 29 does not prematurely disengage from the slot 81 at the upper end of the vertical wall 23 of the frame 21, a hook 83 is provided about the pin 79 on the carrier 29. The hook includes a slot 85 which is adapted to receive a raised member 87 provided on the upper end of the vertical wall 23 of the frame 21 closely adjacent the hook-shaped slot 81 (FIG. 12). This interlocking arrangement provides further stability for the apparatus according to the present invention.

Also, in order to further ensure that the carrier 29 can be returned from the final dumping position as seen in FIG. 9 to the rest position as seen in FIG. 6, pin members 91 are arranged on either side of the pulleys 51 provided at the upper end of the extensible/retractable piston 53 (FIGS. 3–5). The pins 91 define abutments which are adapted to engage within abutments defined by substantially C-shaped channels 93 (FIG. 9) provided on a side of the carrier 29 which side, in the rest position is generally adjacent a lower end of the vertical wall 23 of the frame 21. The channels 93 extend sufficiently far around the carrier 29 to be engaged by the pins 91 during at least the portion of the movement of the carrier 29 from the intermediate position to the final dumping position during which portion the center of gravity C passes the plane P.

The channels 93 are preferably securely welded to the frame 29 and provide a surface against which the pins 91 abut to urge the carrier 29 back toward the rest position after dumping upon retraction of the second tilting arrangement, i.e., the piston-cylinder arrangements 67. In a preferred embodiment, the pins 91 are provided with ball bearing races 95 (FIGS. 3–5) surrounding each pin 91 such that sliding engagement with the channels 93 is facilitated.

In order to return the carrier 29 and the container 75 arranged therein to the rest position, the sequence of operation described above is reversed. In other words, the piston-cylinder arrangements 67 are first retracted to tilt or pivot the carrier 29 about the horizontal axis defined by the pin 79 to the intermediate position (FIG. 8). Thereafter, the main piston 53 is retracted to tilt the carrier thereby disengaging the pin 79 from the slot 81 and returning the carrier 29 to the rest position (FIG. 6). During return of the carrier 29, the cables 38 are withdrawn from the take-up arrangement.

With reference to FIG. 1, a guiding arrangement is provided for ensuring that the training wheels 107 engage within the guide tracks 105 provided on the frame 21 (FIG. 2) during return movement of the carrier 29 from the intermediate tilted position to the rest position. The guiding arrangement includes two arc-shaped members 123 extending upwardly from posts 127 forming the vertical wall 23. Attached on a lower portion of the carrier 29 are a pair of rollers 125 to aid in smoothly guiding the carrier 29. The rollers 125 are spaced apart a distance substantially equal to the distance between the outer surfaces of the posts 127.

In operation, as the carrier 29 returns from the intermediate position, if, due to movement of the carrier 29, the guide wheels 107 are not properly aligned with the guide tracks 105, one of the rollers 125 will contact the respective arc-shaped member 123 and slide downwardly along the arc-shaped member 123 toward the outside of the post 127. In this way, proper alignment of the carrier 29 and particularly the guide wheels 107 with the guide tracks 105 is ensured.

It should be noted that the frame 21 is subjected to a substantial unbalanced force in the final dumping position due to the weight of the combined carrier 29 and container 75. If a dumping apparatus according to the present invention is arranged as a stationary device, this unbalanced weight force can be compensated for by a proper foundation and support for the frame 21. However, it is preferred that the dumping apparatus according to the present invention be mobile so as to be easily transported to any desired location, e.g., within a cotton field or from one field to the next. Accordingly, it is desirable that the dumping apparatus according to the present invention can be rapidly and securely stabilized for operation.

Accordingly, in a further aspect according to the present invention a stabilizing or counterbalancing arrangement is provided which includes a counterforce structure 95 (FIGS. 2 and 6) arranged on the frame 21 on a side opposite the side to which dumping is to occur. The counterforce structure 95 preferably includes a plate or ramp 97 pivotably arranged about a point 99 at a lower end of the frame 21. The ramp or plate 97 can be arranged in a stowed position, i.e., a generally vertical orientation, for easy transportation of the frame 21 and carrier 29.

When it is desired to use the dumping apparatus according to the present invention, the ramp 97 is pivoted downwardly to an accessible position (shown in dotted lines in FIG. 6). At this time, the ramp 97 is accessible for loading with appropriate weights to counterbalance the combined weight of the container 75 and the carrier 29 in the final dumping position. In an exemplary form of the present invention, a tractor or other vehicle 101 which may have been used to deliver the trailer or container 75 to the carrier 29 may be unhooked from the container 75 and conveniently driven upon the ramp 97 arranged in the accessible position. In this way, no additional apparatus is required to counterbalance the dumping apparatus according to the present invention. Further, the counterbalancing can be accomplished in a rapid and efficient manner.

The principles, preferred embodiments and mode of operation of the present invention have been described in the foregoing specification. However, the invention which is to be intended to be protected is not to be construed as limited to the particular embodiments disclosed. The embodiments are to be regarded as illustrative rather than restrictive. Variations and changes may be made by others without departing from the spirit of the present invention. Accordingly, it is expressly intended that all such variations and changes which fall within the spirit and scope of the present invention as defined in the claims be embraced thereby.

What is claimed is:

1. A container dumping apparatus comprising:

a mobile frame having a generally upright side wall over which the container is to be dumped;

a carrier positioned on the frame for movement relative thereto, said carrier including means for securely supporting a container to be dumped;

actuating means for moving said carrier between rest and final dumping positions, said actuating means comprising:

power-driven tilting means for initial tilting of the carrier including a first portion and a second extensible/retractable portion operably connected thereto, cable means anchored at one end to said carrier and at another end to said first portion, said extensible/retractable second portion being arranged to act upon said cable means intermediate the anchored ends to selectively shorten the span of said cable means extending between said carrier and said extensible/retractable second portion for causing the carrier to roll upwardly along said wall from the rest position to an intermediate position wherein the container is partially tilted, said carrier and said wall engaging with one another to define a substantially horizontal pivot axis in response to said carrier moving toward said intermediate position, said pivot axis being contained in an imaginary vertical plane, said container and said carrier together defining a center of gravity which lies on a side of said imaginary plane opposite the side on which the container is to be dumped when said container is in said intermediate position, power-operated second tilting means connected to said first portion for displacing said first portion and said other end of cable means for rotating said carrier about said pivot axis to the final dumping position, said center of gravity passing across said imaginary plane during movement from the intermediate position to the final dumping position, and carrier returning means for positively swinging said carrier from said final dumping position and comprising first abutment means on said carrier, and second abutment means on an upper end of said second portion of said tilting means and arranged to slidably engage said first abutment means in said dumping position of said carrier for exerting forces on said carrier to positively return said carrier from said final dumping position.

2. Apparatus according to claim 1, further comprising a counterforce structure mounted on said frame for movement between a stored position and an accessible position, said counterforce structure being located on a side of said imaginary plane which side is opposite the side on which the dumping takes place, said counterforce structure having a surface adapted in the accessible position to be driven upon by a vehicle to counterbalance the forces exerted on said frame during dumping.

3. Apparatus according to claim 1, wherein said first portion includes a tension equalizer plate freely pivotably secured about a center point to said first portion, said cable means comprises two individual cables, ends of said cables anchored to said first portion being secured to said equalizer plate at locations opposite and substantially equidistantly spaced from the center point of said plate.

4. Apparatus according to claim 1, further comprising guide means for substantially preventing longitudinal displacements of the carrier during movement of the carrier between the rest and intermediate positions.

5. Apparatus according to claim 4, wherein the guide means includes guide tracks arranged on the frame for engagement with guide wheels arranged on said carrier.

6. Apparatus according to claim 5, further comprising means for ensuring engagement of the guide wheels with said guide tracks during return movement of said carrier from the intermediate tilted position to said rest position.

* * * * *